Jan. 23, 1940.                J. HUTCHINSON                2,188,185
                            RUG DISPLAY APPARATUS
                            Filed Oct. 14, 1939            5 Sheets-Sheet 1
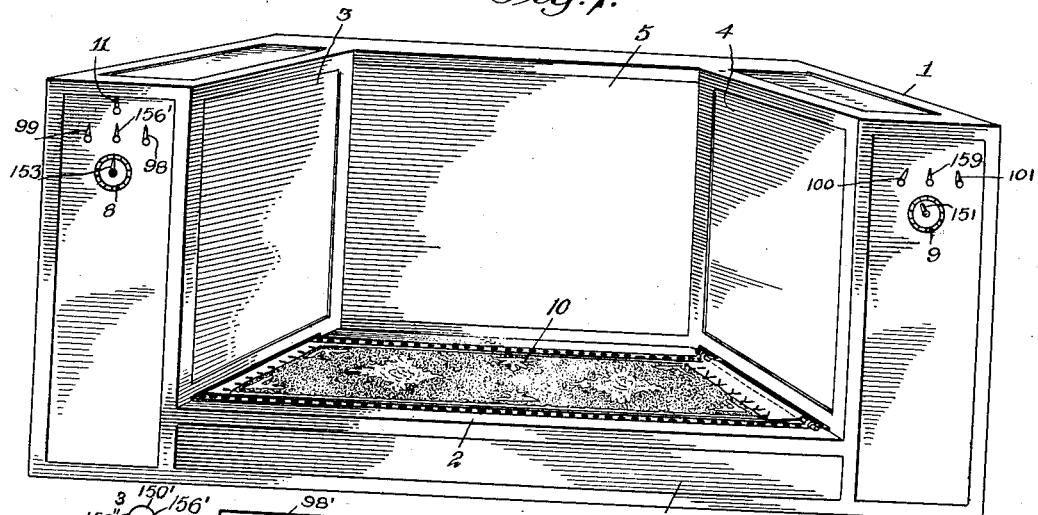
WITNESSES                                              INVENTOR
                                                     Job Hutchinson
                                                           BY
                                                                ATTORNEYS Jan. 23, 1940.                J. HUTCHINSON                2,188,185
                           RUG DISPLAY APPARATUS
                           Filed Oct. 14, 1939         5 Sheets-Sheet 2
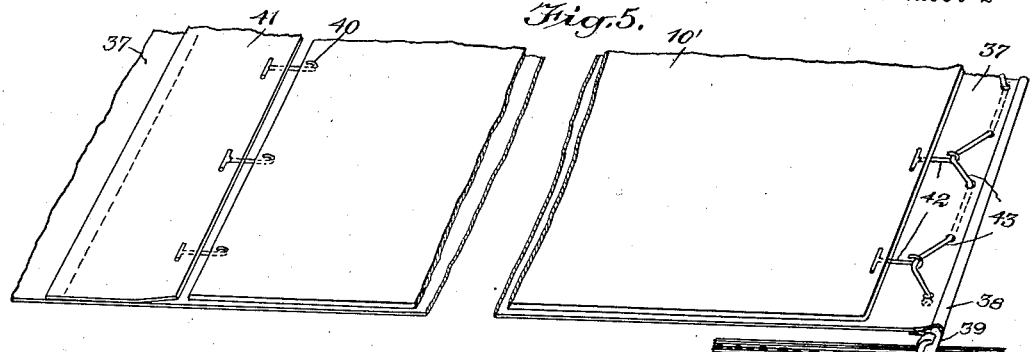
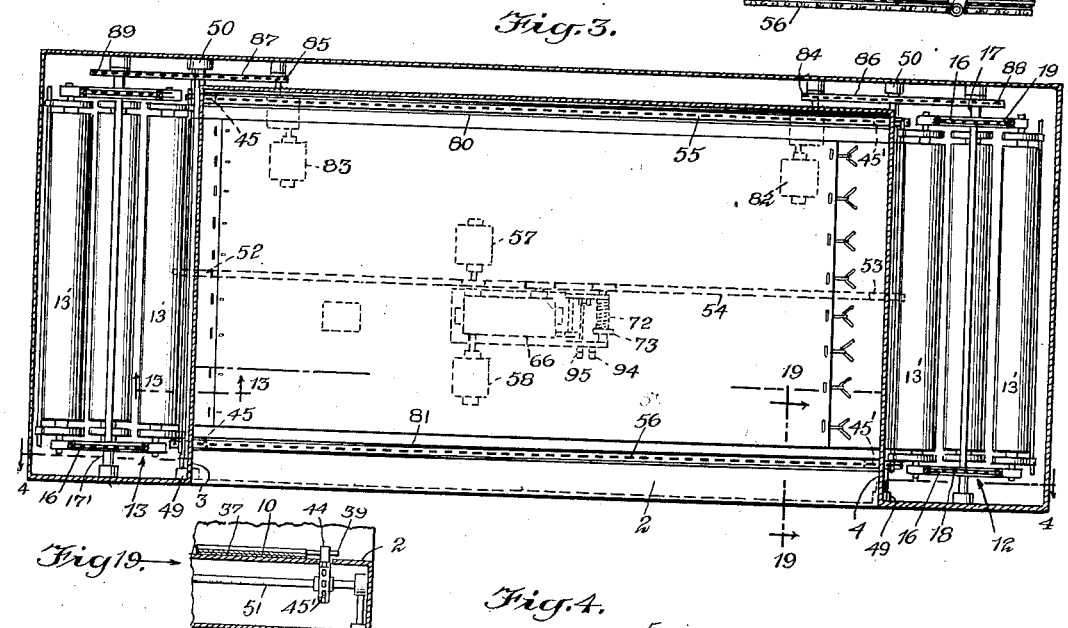
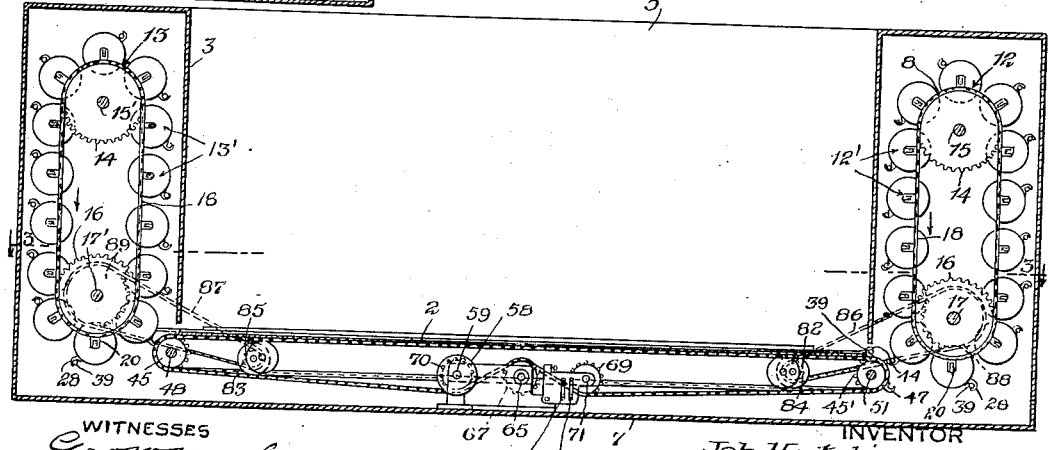
WITNESSES                                               INVENTOR
                                                    Job Hutchinson
                                                          BY
                                                   Munn, Anderson & Liddy
                                                        ATTORNEYS

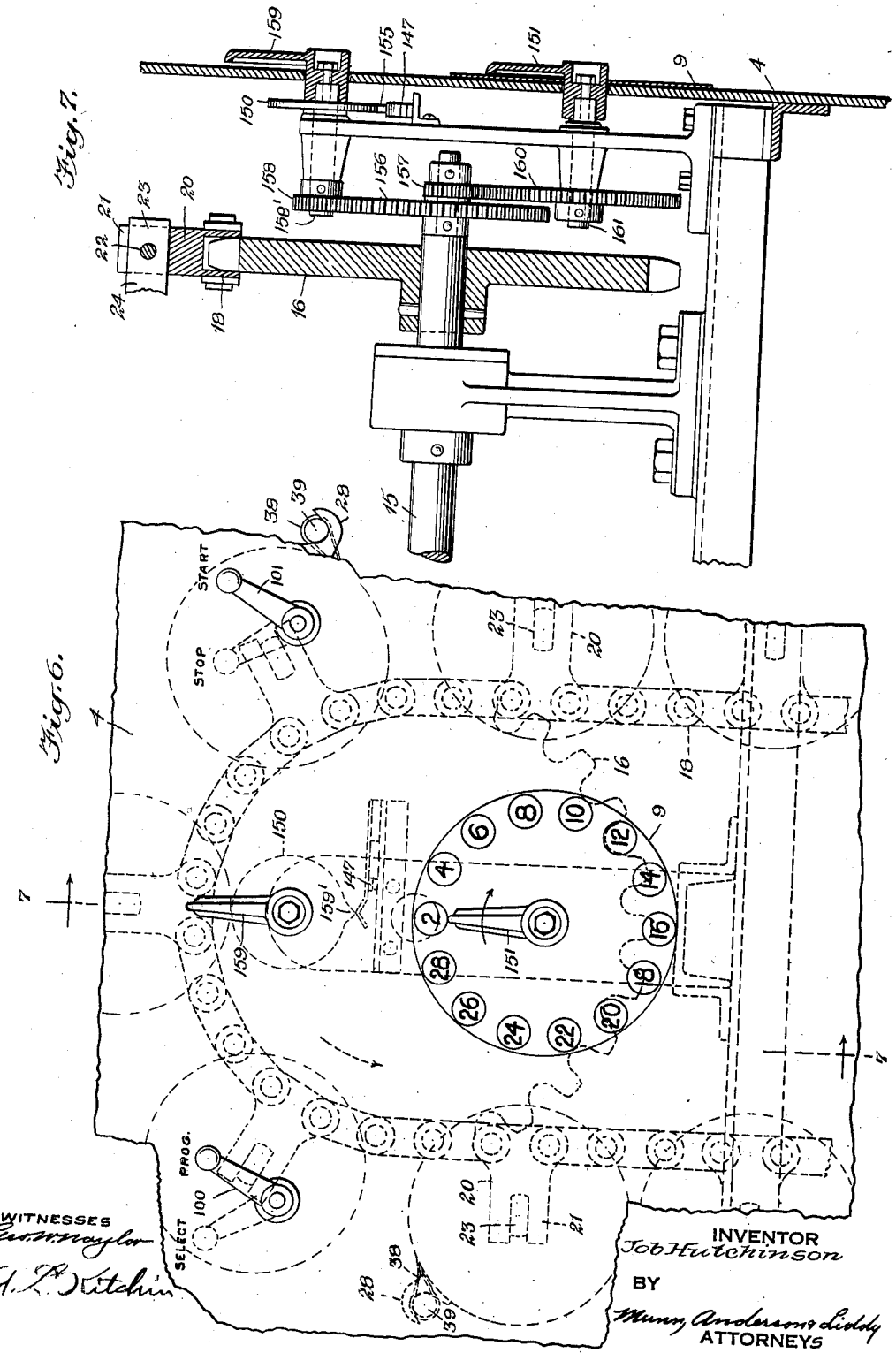

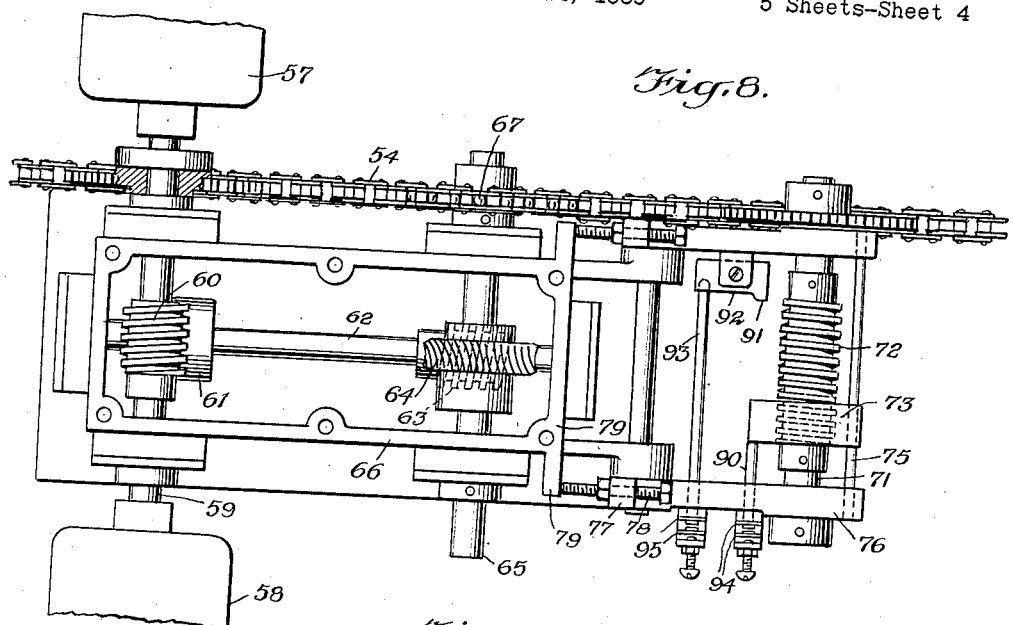

Jan. 23, 1940.　　　　　J. HUTCHINSON　　　　　2,188,185
RUG DISPLAY APPARATUS
Filed Oct. 14, 1939　　　5 Sheets-Sheet 5
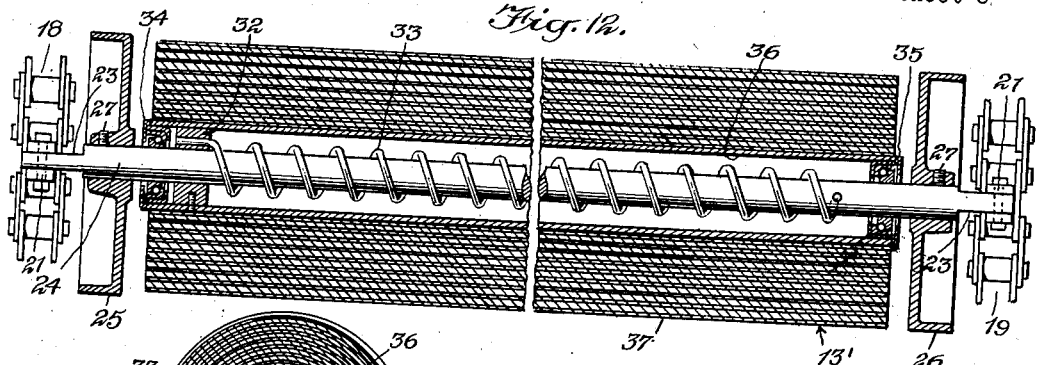
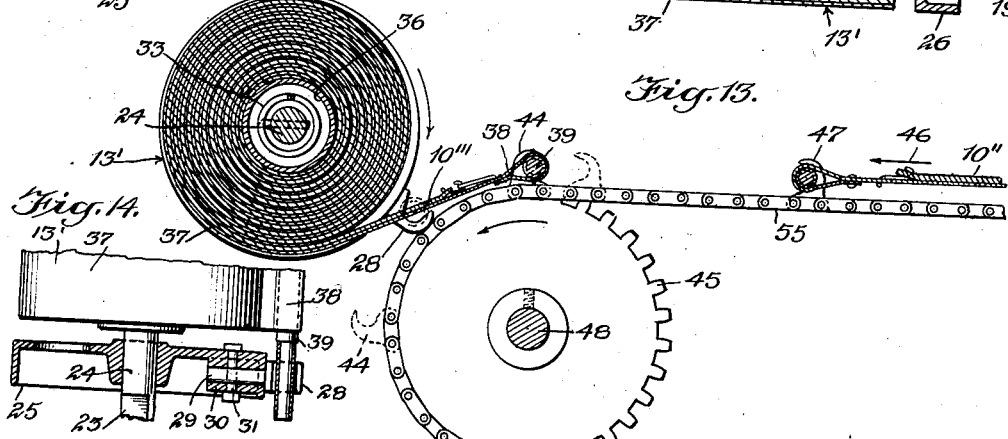
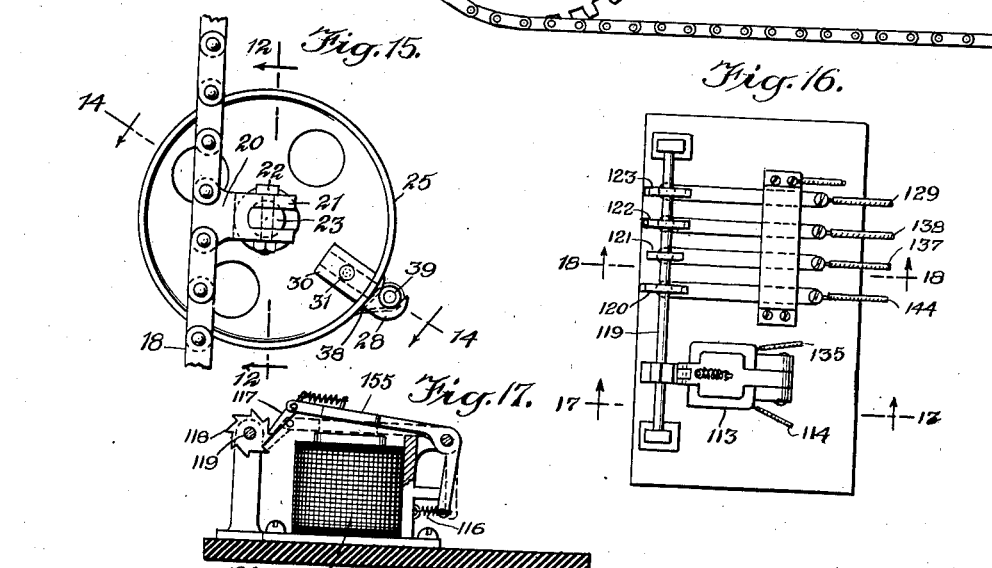
INVENTOR
Job Hutchinson
BY
Munn, Anderson & Liddy
ATTORNEYS
WITNESSES Patented Jan. 23, 1940

2,188,185

UNITED STATES PATENT OFFICE 2,188,185

RUG DISPLAY APPARATUS

Job Hutchinson, Great Neck, N. Y.

Application October 14, 1939, Serial No. 299,488

16 Claims. (Cl. 40—84)

This invention relates to display devices and particularly to an improved display apparatus for displaying rugs or similar articles, an object being to provide a construction which is comparatively simple and wherein the rugs are automatically brought to view from time to time as the apparatus functions.

Another object of the invention is to provide a rug display apparatus formed with a central platform and end compartments, together with means for moving rugs from the end compartments on to the platform for display.

A further object is to provide a device for successively displaying rugs from a plurality of compartments provided with means for quickly bringing any desired rug to view for a second inspection.

An additional and more specific object of the invention is to provide a rug display apparatus for displaying rugs on a platform adjacent the rug storage compartments, with the mechanism so formed that the rugs may be displayed successively as the machine continues to function or may function to bring a single rug to view and leave the same exposed for any desired length of time.

In the accompanying drawings—

Fig. 1 is a front perspective view of a rug display apparatus disclosing an embodiment of the invention, a rug being illustrated on the display platform;

Fig. 2 is a diagram of the electric circuit used in the mechanism of the apparatus shown in Fig. 1;

Fig. 3 is a horizontal sectional view through the apparatus shown in Fig. 1, the section being taken on the line 3—3 of Fig. 4;

Fig. 4 is a vertical sectional view through Fig. 3 on the line 4—4;

Fig. 5 is a perspective view illustrating how the rugs to be displayed are temporarily connected to supporting canvas sheets;

Fig. 6 is an enlarged side view of the upper part of one of the compartments shown in Fig. 1, certain parts being broken away and other parts being shown in dotted lines to illustrate the general arrangement of the moving chain and associated parts;

Fig. 7 is a sectional view through Fig. 6 approximately on the line 7—7;

Fig. 8 is a plan vew of a chain driving mechanism embodying certain features of the invention, the top plate being removed;

Fig. 9 is a side view of the structure shown in Fig. 8;

Fig. 10 is an enlarged fragmentary sectional view through Fig. 9 on the line 10—10;

Fig. 11 is a fragmentary top plan view of one end of a rug carrying roller and one end of the rug folding chain;

Fig. 12 is a longitudinal vertical sectional view through one of the rug carrying rollers shown in Fig. 4, the section being taken approximately on the line 12—12 of Fig. 15;

Fig. 13 is an enlarged fragmentary sectional view through Fig. 2 approximately on the line 13—13;

Fig. 14 is a plan view of one end of one of the rug carrying rollers shown in Fig. 2, with the end drum shown in section, the structure illustrating how the pull bar of the canvas on the roller is engaged by the retaining hook;

Fig. 15 is an end view of the roller and associated parts shown in Fig. 12;

Fig. 16 is a top plan view of an electric actuated pawl and ratchet and switch mechanism embodying certain features of the invention;

Fig. 17 is a sectional view through Fig. 16 on the line 17—17, the same being on a somewhat enlarged scale;

Fig. 18 is a sectional view through Fig. 16 on the lines 18—18, the same being on a somewhat enlarged scale; and Fig. 19 is a detail fragmentary sectional view through Fig. 3 approximately on the line 19—19.

Referring to the accompanying drawings by numerals, 1 indicates a casing which is provided with a platform 2, end compartments 3 and 4, and a rear wall 5. A front wall 6 is also provided and a rear wall 5. A front wall 6 is also provided so as to cover the mechanism below the platform. The casing 1 is also provided with a bottom 7, as shown in Fig. 4, so that all the moving parts of the mechanism are either behind wall 6 or in the compartments 3 and 4, except the indicating members or dials 8 and 9 shown in Fig. 1. As illustrated in Fig. 1, there is a rug 10 exposed to view and this rug extends from near compartment 3 to near compartment 4. Smaller rugs than rug 10 could be displayed but larger rugs could not be displayed in the particular apparatus illustrated. The rug 10 may be a full-room size rug or, in fact, a rug of any desired size. It will be observed that the apparatus is only slightly longer than the rug and, consequently, the entire apparatus will not take up much floor space in a salesroom even though a large number of rugs are in the apparatus. As indicated by the dials 8 and 9 there are twenty-eight rugs in the apparatus, there being fourteen rugs in each compartment when the rug 10 shown in Fig. 1 is in its stored position. The apparatus is adapted to be operated by a suitable power means and for convenience in actuation electrically actuated devices are used.

When it is desired to start the apparatus, the master switch 11 is closed and immediately the apparatus begins to operate. If a rug is in the position shown in Fig. 1, it will in a very short time move into one of the compartments 3 or 4, and, at the same time, a new rug will take its place and remain on platform 2 for a certain length of time and then a third rug will be brought out as the second rug is retracted or moved into a compartment. The construction is such that the rugs are alternately moved out of one compartment and into the other compartment until all the twenty-eight rugs have been displayed. If the master switch 11 is kept closed the apparatus will continue to function and display all the rugs a second time. This action will be continued until the master switch has been opened or certain other switches opened as hereinafter fully described.

Referring more particularly to Figs. 3 and 4, it will be seen that in the respective compartments there are provided rug carriers 12 and 13 which are identical in construction and, therefore, the description of one will apply to both. The carrier 12 is provided with a pair of top sprocket wheels 14 connected by a shaft 15 and a pair of bottom sprocket wheels 16 connected by a shaft 17. On these sprocket wheels are mounted the respective chains 18 and 19. Each of these chains is formed as an ordinary sprocket chain except that at spaced intervals there is provided a special link 20 shown particularly in Figs. 6 and 14. Each of the links 20 is formed with a bifurcated end 21 accommodating the flattened end 23 of a bolt 22 which extends through a rug support 12'. As shown particularly in Fig. 12, shaft 24 is connected at its ends through the flattened ends 23 to the respective chains 18 and 19 and is therefore fixed or held against individual rotation. Drums 25 and 26 are rigidly secured to shaft 24 in any suitable way, as, for instance, by set screws 27. Each of these drums is provided with a hook-shaped abutment 28 having a reduced end 29 (Fig. 14) fitting into a suitable bore in an enlargement 30 of the drum. A bolt 31 extends through the enlargement 30 and also through the extension 29, firmly locking the abutment 28 in place. The block 32, as shown in Fig. 12, is rigidly secured to shaft 24 and one end of the coil spring 33 is connected with said block while the opposite end is connected with the shaft 24. Suitable journal or bearing members 34 and 35 are carried by shaft 24 and on these bearing members is mounted a tubular member 36 which with the remaining members form a rug holder or support 12'. A sheet of canvas or other textile fabric 37 is secured at one end to the tubular member 36 and at the other end is provided with a hem 38 accommodating a pull bar 39. The pull bar 39 at its respective ends normally rests on respective abutments 28 carried by the respective drums 25 and 26. As shown in Fig. 4, there are fourteen of the rug holders 12' and on each holder a sheet of canvas 37 is mounted as described. In Fig. 5 this sheet of fabric is shown stretched out and carrying a rug 10'. Suitable fastening means, as for instance pin hooks 40, connect one end of the rug to a flap or extra piece 41 stitched to the sheet 37. At the opposite end the hook pins 42 are looped through an elastic cord 43 which is carried by the fabric 27. In this way a rug may be readily mounted on the canvas 37 and readily removed therefrom. When mounting a rug on the sheet 37, the sheet is unwound and the rug mounted in place as shown in Fig. 5. The parts are then released and spring 33 will automatically wind the sheet of fabric 37 together with the rug so that the parts will appear as shown in Figs. 12 and 13. Mechanism as hereinafter fully described is adapted to engage the ends of the respective pull bars 39 and pull the sheet of fabric 37 together with the rug mounted thereon until the rug is exposed to view as shown in Fig. 1. The carrier 12 has been described in detail but it will be noted that carrier 13 is of identical construction and the rug holders 12' mounted on the carrier are of the same construction.

When the machine is in operation the rug is pulled from a rug holder 12' while the carrier 12 is stationary and is left exposed on platform 2 for a certain length of time. The rug just mentioned is then retracted on to the holder 12' of carrier 12 and during the time of retraction a second rug is pulled from a holder 13' on carrier 13. As the second rug is retracted to holder 13' a third rug is pulled from a holder 12' on carrier 12. This action continues as long as the machine is operating unless certain switches hereinafter fully described are manipulated for producing certain special results, namely, the displaying of certain specific rugs rather than the rugs in succession.

The pulling mechanism for pulling the rugs to the display position shown in Fig. 1, is shown functioning in Fig. 13. From this figure it will be observed that a rug 10'' is being pulled to the display position while a rug 10''' is being retracted. As the hook 44 moves around the sprocket wheel 45, it will deposit the pull bar 39 on the abutment 28 connected to the rug holder 13'. After the bar 39 has been deposited on the abutment 28, the hook 44 moves downwardly a short distance around the sprocket wheel 45 and approximately at the same time the rug holder 13', shown in Fig. 13, is moved upwardly one-fourteenth of the travel of the respective chains 18 and 19, whereby this rug holder, rug and associated parts will be out of the way and a new rug holder 13' and associated parts will be positioned as shown in Fig. 13 ready for the hooks 44 to engage the pull bar thereof and pull the rug and associated parts from the roller in an opposite direction to the arrow 46. While this is taking place, the respective hooks 47 and the rug 10'' are moving to the right as shown in Fig. 13. As shown in Figs. 3 and 4 there are two sprocket wheels 45 connected by a shaft 48, which shaft is mounted in suitable bearings 49 and 50. At the opposite end of the platform 2, similar sprocket wheels 45' are provided and connected by a shaft 51. The shafts 48 and 51 also carry driving sprocket wheels 52 and 53 over which a sprocket chain 54 fits. Sprocket chain 54 is the power chain and is adapted to rotate the respective sprocket wheels 45 and 45' to move the respective pull chains 55 and 56 (Fig. 3) a certain distance in one direction, namely, a distance a little greater than the length of the platform 2 and then the same distance in a reverse direction.

In order for the power chain 54 to be actuated, a special mechanism has been provided, as shown in Figs. 4, 8 and 9. This mechanism includes a pair of electric motors 57 and 58 secured to a drive shaft 59. A worm 60 is rigidly secured to the drive shaft 59 and continually meshes with a worm wheel 61 which is rigidly secured to a shaft 62. Shaft 62 is provided with a worm 63 continually in mesh with a worm wheel 64, which latter wheel is rigidly secured to a shaft 65 carried in suitable bearings in the frame 66. A driving sprocket wheel 67 is rigidly secured to shaft 65 and therefore rotates therewith. The power chain 54 rests on top of the sprocket wheel 67 and passes beneath the idler sprockets 69 and 70, the sprocket 70 being loosely mounted on the shaft 59, while sprocket wheel 67 is rigidly secured to a shaft 71 carrying a threaded sleeve 72 on which a traveling nut 73 is mounted to move back and forth as the sleeve is actuated. This nut is provided with a notch 74 for accommodating the fixed rod 75 whereby the nut cannot rotate but may move back and forth. Shaft 71 is rotatably mounted on a swinging frame 76 which carries the shaft 71 and rod 75 and associated parts. This frame is provided with a pair of offset members 77 accommodating set screws 78, as shown particularly in Fig. 9. These set screws press against the end plate 79 of the frame 66. By adjusting these screws the idler 67 may be shifted to take up any slack in the power chain 54. Motor 57 rotates in one direction when energized and motor 58 rotates in the opposite direction. Shaft 59 is connected to the armatures of both these motors and, consequently, current is turned off one motor before it is turned on the other motor. The armature of one motor will rotate freely as the armature of the other motor is driven. By reason of this structure, it will be seen that when one of the motors is functioning the respective hooks 44 are moving to the right, as shown in Figs. 3 and 13, and when the other motor is functioning the hooks 47 are moving to the left. The hooks 44 when moved to the left stop at the dotted position shown in Fig. 13 while the hooks 44 move to a similar position at the opposite end of the travel of the chains when they reach the end of their travel. The respective pairs of hooks 44 and 47 extend through the respective slots 80 and 81 (Fig. 3) which extend longitudinally for the full length of the platform 2. The chains are adapted to move beneath the platform while the hooks extend through the slots to a certain distance above the platform. The motors 57 and 58 actuate the chains 54 and 55 while motors 82 and 83 actuate the sprocket wheels 84 and 85 and through these sprocket wheels the respective chains 86 and 87, which chains fit over and actuate the sprocket wheels 88 and 89 secured to the respective shafts 17 and 17', which shafts are also rigidly secured to the sprocket wheels 14 and 16 carrying the respective chains 8 and 9 of the carriers 12 and 13. The motors 82 and 83 operate in proper time with the motors 57 and 58 so as to alternately bring the successive rug holders opposite the end of the platform so that the rugs thereon may be engaged and pulled on to the platform by the respective pairs of hooks 44 and 47.

In Fig. 2 a diagram is presented which shows the wiring for the respective motors and associated parts whereby the motors are caused to function in proper time with each other to secure the results above set forth. In Figs. 8 to 10, inclusive, a switch mechanism is shown which is also part of the diagram shown in Fig. 2. As the chain 54 moves in one direction, nut 73 will be moved by the threaded member 72 in one direction and when the chain 54 is reversed nut 73 will be reversed. When nut 73 reaches one end of its travel it will push against the pin 90 and when it reaches the end of its travel in the opposite direction it will press against the projection 91 of the pivotally mounted lever 92 which presses the rod 93. When rod 90 is pressed the spring contacts 94 are brought together and when rod 93 is pressed the spring contacts on switch structures 95 are brought together and the circuit closed at this point. Fig. 10 shows one of these switches in detail from which it will be seen that there is a stationary abutment 96 having a set screw 97, whereby the contacts are prevented from swinging beyond a certain point so that the pin 90, or the pin 93, as the case may be, may close the switch. As the nut 73 reaches one of its extreme movements the switches 94 and 95 are closed and as shown in the diagram in Fig. 2 are illustrated as being connected with the wiring of the motors and other associated parts. When it is desired to start the apparatus, the respective switches 11, 98, 99, 100 and 101 are all closed. The switch 11 is the master switch and when this is closed current from a supply line passes through the circuit. For instance, if the current passes from the plus sign 102, it may flow through wire 103, contacts 104, wire 105, wire 106 to and through the motor 57, and from motor 57, through wire 107, wire 108 and wire 109 back to the source of current through the switch 11. Current flowing in this circuit will rotate motor 57 until the chains 55 and 56 have moved a certain distance. Also the power chain 54 has moved a certain distance and when the parts have traveled this certain distance, nut 73 (Fig. 8) will push the pin 90 and close the circuit at switch 94, whereupon current will pass from wire 106, through wire 110, switch 94, wire 111, wire 112, magnet 113, wire 114, to wire 108, through wire 109, back to the source through switch 11. By energizing the magnet 113, armature 155 will be pulled downwardly against the action of the spring 116 (Fig. 17). This will cause pawl 117 to engage one of the teeth of the ratchet wheel 118 and rotate the ratchet wheel one-eighth of a revolution. This circuit is closed only temporarily and the movement of the ratchet wheel is quickly accomplished and then magnet 113 is deenergized whereupon spring 116 will move the parts back to the position shown in Fig. 17 for another operation. Ratchet wheel 118 is rigidly secured to shaft 119 and on this shaft there are provided four disks, namely, disks 120, 121, 122 and 123. Each of these disks is provided with a pair of diametrically oppositely positioned switch closing cams 124 and 125, as shown in Fig. 18. When the magnet 113 rotates the shaft 119 one-eighth of a revolution as just described, the disk 120 will be moved so as to permit the switch 104 to open. At the same time it will move the disk 123 for closing the switch 126. When switch 126 is closed, current will pass from the source of current at point 102, through wire 103, wire 127, switch 126, wire 129, wire 130, hand switch 101, motor 82, wire 131, wire 132, and wire 109 back to the source. The motor 82 will rotate as long as the switch 126 is closed. At the same time that current is being supplied to motor 82, current will pass from wire 129, through switch 103, switch 133, wire 134, wire 135, magnet 113, wire 114, wire 108 and wire 109, back to the source. This circuit is closed only temporarily as cam 159' (Fig. 6) is closed only for a brief time. Current flowing in this circuit will cause the magnet 113 to rotate the ratchet wheel 118 and rotate the shaft 119 one-eighth of a revolution. This will cause the cam or disk 123 to move away from switch 126 so that this switch will automatically open and thereby deprive motor 82 of current. However, before motor 82 has been deprived of current it has moved the carrier 12 one-fourteenth of its travel so that a new rug holder will come opposite the end of the platform. At the same time that switch 126 is opened, one of the cams of disks 122 will close switch 136, whereupon current will pass from the supply 102, through wire 103, wire 137, switch 136, wire 138, wire 139, wire 140, to the motor 58 and through this motor to wire 141, wire 132, wire 109, back to the source of power. This will set motor 58 into motion for moving the power chain 54 and associated parts back to their former positions. This movement continues until the traveling nut 73 strikes the projection 91 so as to push pin 93 and close the switch 95. When this switch is closed, current will pass from the source at 102, through wire 103, wire 137, switch 136, wire 138, wire 139, wire 142, switch 95, wire 112, magnet 113, wire 114, wire 108 and wire 109, back to the source. By the closing of the switch 95, the circuit of magnet 113 will be closed and the ratchet wheel 118 will be rotated one-eighth of a revolution. This will cause the cam or disk 122 to move away from the switch 136 and, at the same time, cause the cam or disk 121 to close the switch 143. When this has been done, current will pass from the source at 102, through wire 103, wire 144, switch 143, wire 145, wire 146, wire 149, through switch 99, motor 83, wire 150, wire 108, and wire 109 back to the source. Current flowing through motor 83 operates the same sufficiently to move one rug holder 13' on carrier 13 one step forward and then the current is turned off by the action of the magnet 113 rotating wheel 118 so that the disk 120 will be in the position shown in Fig. 2. This result is secured by the fact that current flowing in wire 146 will divide at hand switch 98 and some of the current will flow through wire 98', switch 147, wire 148, wire 135, magnet 113, wire 114, wire 108 and wire 109 back to the source. Current flowing in this circuit will cause magnet 113 to rotate shaft 118 and move the cam on disk 121 away from switch 143 for opening the circuit of motor 83. At the same time the cam on disk 123 will close switch 104. The parts are so timed that the cam 159" of disk 150' acts to close switch 147 immediately at the end of the time for motor 83 to function so that the rug holder will stop at the proper point opposite platform 2. The cycle then repeats. Each time the motor 82 functions the indicating arm 151 on dial 9 moves one-fourteenth of a revolution so as to point at one of the legends 152 for indicating when each particular rug is opposite the end of the platform 2. The same is true in regard to the motor 83 as each time it functions the pointer 153 will move one-fourteenth of a revolution to point at one of the legends 154 on dial 8. As shown in Fig. 6, the pointer 151 is pointing at the numeral 2 which would be the beginning of the cycle. At the same time, the cam 159" on the disk 150' is closing the switch 147. The disk 150 is geared to the shaft 15, as shown in Fig. 7, and makes one revolution for each forward movement of each of the rug holders on the carrier. As shown in Fig. 7, the gear wheel 156 is rigidly secured to the shaft 15 and also a pinion 157. Gear wheel 156 meshes with a pinion 158 to which the disk 150 is secured through a suitable shaft 159'. The pointer 159 is rigidly secured to disk 150 and rotates therewith. Pinion 157 continually meshes with a gear wheel 160 which is of the same size as gear wheel 156. The gear wheel 160 is rigidly secured to a shaft 161 which in turn is rigidly secured to pointer 151. The gearing is so proportioned that the disk 150 and pointer 159 will make one complete revolution for each one-fourteenth of a revolution of the pointer 151.

When the parts are in normal functioning position and all the manually actuated switches shown in Fig. 2 are closed, the mechanism described will continually function as long as its power is turned on. As the parts function, one rug is displaced from carrier 12 and then returned to carrier 12 and then a rug from carrier 13 is displayed. This is followed by displaying a rug from carrier 12 and then from carrier 13. This action is continued until all the rugs have been displayed. After the twenty-eight rugs have been displayed, if the power is left on, the apparatus will repeat the operation and will redisplay the rugs in the order mentioned. However, if some particular rug should be attractive to the customer and he should desire to have the rug displayed again, the parts of the apparatus may be adjusted to cause that one special rug to be re-displayed and left displaced for any desired time. For instance, if the rug indicated by the numeral 4 in Fig. 2 were desired, the switches 98, 99 and 100 could be opened and switches 11 and 101 closed. At this time the switch 126 would also be closed so that current would pass from point 102 through switch 126, wire 129, wire 130, switch 101, motor 82, wire 131, wire 132, and wire 109 back to the source. This would cause motor 82 to continuously function and thereby cause the carrier 12 to move continuously. When the pointer 151 reached the numeral 4 in Fig. 2, switch 101 would be opened and the remaining switches closed, whereupon motor 57 would function to pull the rug from the carrier 12. When this had been done, the switch 11 would be opened. This would stop the apparatus with the desired rug exposed on platform 2. This rug would remain exposed until the apparatus was again started. If any of the other rugs were desired, a similar operation could be made to bring the desired rug to a point opposite the platform and then the carrier stopped after which the pulling mechanism could be started and actuated until the desired rug was pulled into view. Under circumstances of this kind the main switch would be opened so as to stop all moving parts until the customer had ample time to examine the rug.

I claim:

1. A display apparatus for displaying rugs including a casing provided with a back wall, a centrally positioned platform and a compartment at each end of the platform, there being an opening in each compartment in line with the top of the platform, means in each compartment for supporting a plurality of rugs and means alternately moving rugs from the respective compartments on to said platform and from said platform back into the compartments.

2. A display apparatus for displaying rugs including a casing provided with a back wall, a centrally positioned platform having a pair of slots therein and a compartment at each end of the platform, there being an opening in each compartment in line with the top of the platform, means in each compartment for supporting a plurality of rugs, a reciprocating member positioned beneath said platform, a plurality of pairs of hooks extending through said slots adjacent each end of said reciprocating member and means carried by each rug adapted to be interlocked with said hooks for moving the rugs on the platform, one pair of hooks functioning to pull rugs from one compartment and the other pair of hooks functioning to pull rugs from the other compartment, and retractile spring means associated with each rug for retracting the rug into a compartment when released by the hooks.

3. A rug display apparatus including a slotted platform, a supporting structure at each end of said platform carrying rugs to be displayed, an individual support for each of the rugs carried by said supporting structure, each of said individual supports including a roller, a spring for rotating the roller in one direction, a flexible sheet secured at one end to said roller, a bar secured to the free end of each sheet, and means for securing a rug to each sheet, a reciprocating member positioned beneath said platform, a pair of hooks adjacent each end of said reciprocating members positioned to interlock with said bars for pulling said sheets and rugs carried thereby on to said platform and at the same time wind the spring associated with that rug, said hooks extending through said slots as they move from one end of the platform to the other, said springs acting to rewind said sheets and rugs as said hooks move in reverse directions whereby the rugs are brought back to said supporting structures.

4. A rug display apparatus including a platform, a compartment positioned at each end of the platform, each of said compartments having an opening in line with the upper surface of the platform, an endless carrier positioned in each of said compartments, a plurality of rollers mounted on each of said carriers, a sheet of fabric secured at one end to each of said rollers, a spring for each of said rollers for continually tending to wind the sheet of fabric thereon, a pull bar connected to the free end of each of said sheets of fabric, and a reciprocating structure alternately functioning in connection with the respective compartments for engaging and pulling a pull bar and sheet secured thereto across said platform, said reciprocating structure functioning in time with said endless carriers.

5. A display apparatus for displaying rugs including a casing provided with a platform and a compartment at each end of said platform, each of said compartments having an opening in line with the top surface of the platform, rug carrying means in each compartment carrying a plurality of rugs and means for alternately pulling a rug from the respective compartments in such a direction that the respective rugs will be spread on said platform.

6. A display apparatus for displaying rugs including a casing provided with a platform and a compartment at each end of said platform, each of said compartments having an opening in line with the top surface of the platform, rug carrying means in each compartment carrying a plurality of rugs, means for alternately pulling a rug from the respective compartments in such a direction that the respective rugs will be spread on said platform, and means carried by the respective carriers for moving the rugs off of said platform back into the respective compartments, the last mentioned means functioning to move a rug into one compartment as a rug is being pulled from the other compartment.

7. A display apparatus for displaying rugs including a casing provided with a platform and a compartment at each end of said platform, each of said compartments having an opening in line with the top surface of the platform, rug carrying means in each compartment carrying a plurality of rugs and means for alternately pulling a rug from the respective compartments in such a direction that the respective rugs will be spread on said platform, said rug carrying means including a roller for each rug, a fabric sheet secured at one end to each roller, means for removably securing a rug to each sheet, and a spring for each roller continually tending to rotate the rollers in a direction to wind said sheets and rugs on the rollers.

8. A display apparatus for displaying rugs including a casing provided with a platform and a compartment at each end of said platform, each of said compartments having an opening in line with the top surface of the platform, rug carrying means in each compartment carrying a plurality of rugs, means for alternately pulling a rug from the respective compartments in such a direction that the respective rugs will be spread on said platform, said means for alternately pulling said rugs including a pair of reciprocating chains, a pair of hooks on each of said chains and a bar connected with the respective rugs positioned to be engaged and pulled by one hook on each chain as the apparatus functions.

9. A display apparatus as set forth in claim 7 characterized by a fixed shaft for each of said rollers, a drum secured to each end of each of said rollers and aligned hook-shaped stops carried by the drum on each roller for engaging said pull bar for preventing the same from moving around the roller and for holding the same in position to be engaged and pulled by said pulling means.

10. A display apparatus for displaying rugs including a platform, an endless rug carrier at each end of said platform formed to carry a plurality of rugs to be displayed, means for actuating said carriers so the rugs carried thereby will move in succession to the end of said platform and then from the end of the platform and power actuated means for pulling the respective rugs from said carriers to a position on said platform immediately after they have reached the end of the platform, said power means functioning to alternately pull a rug from the respective carriers.

11. A display apparatus as set forth in claim 10 characterized by hand controlled means for stopping the pulling means without stopping the endless carrier and means for indicating where the rugs on the carrier are located in respect to the end of the platform whereby said pulling means may be stopped until a particular rug arrived at the end of the platform and then starting to pulling said particular rug on to the platform.

12. An apparatus for displaying rugs including a platform, an endless carrier at each end of said platform, each carrier including a pair of chains, each chain having spaced links provided with bifurcated brackets, the brackets on one chain being in alignment with the brackets on the other chain, sprocket wheels for carrying said chains, power actuated means for rotating two of said sprocket wheels for driving said chains, a rod for each pair of brackets, means for securing said rods to said brackets, a roller rotatably mounted on each of said rods, a fabric sheet secured at one end to each of said rollers, means for removably securing a rug on each of said fabric sheets, a pull bar secured to each of said fabric sheets at the free ends thereof, a drum rigidly secured to each of said rods near each end thereof, a hook-shaped stop extending from each of said drums adapted to engage and hold said bars against moving around said rollers, coil springs acting on said rods and said rollers tending to continually wind said fabric sheets on the respective rollers, and power actuated means positioned to engage and pull said pull bars in succession on to said platform and then release them, said coil springs functioning to pull said sheets from said platform and wind them on said rollers when said power actuated pull means releases said pull bars.

13. A display apparatus for displaying rugs including a platform having a pair of spaced longitudinally extending slots, an endless chain positioned immediately below each of said slots and parallel therewith, a pair of hooks carried by each of said chains adapted to project through the respective slots when the chains are functioning, the hooks on each chain facing, power actuated means for causing said chains to function, an endless carrier at each end of said platform, separate prime movers for actuating said endless carriers, and means for supporting rugs on said endless carriers, said means including a rug carrying sheet having a pull bar secured thereto, said endless carriers being positioned in respect to said chains so that whenever the hooks on the chain move away from the carriers they will interlock with a draw bar and pull a rug carrying sheet to a position on said platform.

14. A rug display apparatus including a display platform having slots therein, a rug carrying endless carrier at each end of said platform, means positioned beneath said platform and having abutments extending through said slots for pulling rugs from the respective carriers on to the platform, a separate prime mover for causing the rug pulling means and the respective endless carriers to function and an independent manually actuated control for said prime movers whereby they may be caused to function simultaneously and also independently.

15. A display apparatus for displaying rugs including a platform, a carrier at each end of said platform formed to support a plurality of rugs, means for alternately pulling rugs from the respective carriers and moving them on to said platform, and means carried by said carriers for moving rugs from the platform shortly after they have been pulled thereon, said pulling means including a pair of rug shifting chains, a pair of abutments carried by each of said rug shifting chains adapted to alternately interlock with a rug carried by one of said carriers, means including a power chain for causing the rug shifting chains to function, a sprocket wheel for reciprocating said power chains, a pair of oppositely rotating electric motors for actuating said sprocket wheel, an electric circuit for each of said motors, each of said circuits including a switch normally and resiliently held open, a reciprocating member positioned near each of said switches, an auxiliary sprocket driven by said power chain, a threaded member secured to and rotated by said auxiliary sprocket, a traveling nut carried by said threaded member, said threaded member being positioned so that said nut will strike and push one of said reciprocating members for closing the switch associated therewith when the nut has reached one end of its travel, and a pivotally mounted lever positioned to be swung by said nut when it reaches the other end of its travel, said lever being positioned to push the other of said reciprocating members for closing the other of said switches and electrically actuated means for opening the circuit of one of said motors as the switch associated with the other motor is closed.

16. A display apparatus as set forth in claim 15 characterized by the formation of said electrically actuated means with a rotating shaft, a ratchet wheel secured to said shaft, a pawl for rotating said ratchet wheel, a pivotally mounted armature, means for pivotally mounting one end of said pawl on one end of said armature, a spring for normally holding said armature in a given position, an electric magnet for moving said armature against the action of said spring for causing said pawl to rotate said ratchet wheel the distance of one tooth, a plurality of spaced disks secured to said shaft, each disk having diametrically positioned projecting cams, and a two pronged switch arranged adjacent each of said disks so that as the disks rotate the cams thereon will temporarily close said switches.

JOB HUTCHINSON.